ELECTRONIC REGISTERS FOR BINARY DIGITAL COMPUTING APPARATUS

Filed Sept. 12, 1952 2 Sheets-Sheet 1

INVENTORS:
JOHN BRUCE
KEITH GORDON HUNTLEY
ERIC LAWRENCE CASLING WHITE
BY Ralph E. Atherton
Attorney INVENTORS:
JONN BRUCE
KEITH GORDON HUNTLEY
ERIC LAWRENCE GASLING WHITE
BY Ralph E. Atherton
Attorney United States Patent Office 2,785,304

Patented Mar. 12, 1957

2,785,304

ELECTRONIC REGISTERS FOR BINARY DIGITAL COMPUTING APPARATUS

John Bruce, Ealing, London, Keith Gordon Huntley, Harlington, Hayes, and Eric Lawrence Casling White, Iver, England, assignors to Electric & Musical Industries Limited, Hayes, England, a company of Great Britain Application September 12, 1952, Serial No. 309,232

Claims priority, application Great Britain September 15, 1951

7 Claims. (Cl. 250—27)

This invention relates to electronic registers for binary digital computing apparatus, and especially to shifting registers for apparatus operating in the time serial mode.

The invention relates in particular to electronic registers of the "delay storage" type and where reference is made herein and in the claims to a register of the delay storage type it is to be understood to mean a register including at least two triggers each of which has two states of equilibrium and comprises two valves with anodes and control electrodes cross-coupled to produce two equilibrium states of the trigger with only one valve conducting in each state of the trigger, and coupling means for transferring the state of a first of said trigger to the second, if different therefrom, under the control of transfer pulses, said coupling means including unilaterally conductive paths which are rendered conducting by a transfer pulse, in dependence upon the states of the triggers, the coupling circuit also including a storage device whereby the second trigger is left in the previous state of the first trigger on the termination of a transfer pulse.

One form of electronic register of the delay storage type is described in "Electronic Engineering" for December, 1950, page 495 et seq., with reference to Figure 10, the register being intended for use as a shifting register in binary digital computing apparatus operating in the time-serial mode. The triggers are of the Eccles-Jordan type, and a group of them are coupled in succession so that the register can perform the functions of "writing" a number into it for storage until required and of "reading" a stored number. For "writing" the number is fed as a series of digits each of which consists of a pulse or no pulse (e. g. representing 1 or 0) to the first trigger in synchronism with a series of transfer pulses and for "reading" the number is fed out of the last trigger when a further series of transfer pulses is applied. In the register described in said publication the coupling between two triggers is from the anodes of the valves of one trigger to the control electrodes of the alternate valves of the next trigger, so that in the intervals between shift pulses, the unilaterally conductive devices have applied to them "back" potential which may be of the order of the positive polarising potential for the anodes of the valves of the triggers, and at the least is the potential difference which exists between the anode of a conducting trigger valve and the control electrode of a non-conducting trigger valve. This restricts the choice of elements for use as the unilaterally conductive devices to thermionic valves, which are undesirable on account of their bulk and their consumption of heater current, which it is important to keep to a minimum when large numbers of similar circuits are involved. Furthermore shift pulses of large amplitude are required in the register described in the aforesaid publication.

The object of the present invention is to provide an improved electronic register of the delay storage type in which crystal diodes can be used in the coupling means between the triggers and/or in which shift pulses of smaller amplitude can be used than in the above described form of register.

In order that the said invention may be clearly understood and readily carried into effect, the same will now be more fully described with reference to the accompanying drawings.

Figure 1:
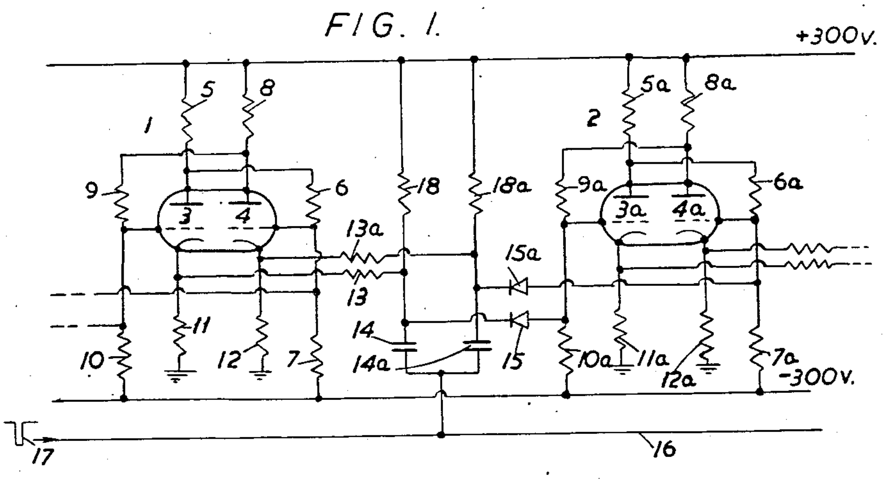
Figure 1 illustrates diagrammatically one form of electronic shifting register according to the present invention.

Referring to Figure 1, two stages of the shifting register are illustrated therein, the stages respectively comprising thermionic valve triggers denoted in general by the reference numerals 1 and 2. It is to be understood, however, that the complete register will comprise a large number of such triggers connected in succession, the number being dependent upon the number of binary digits to be stored in the register. The triggers are of a known form having two stable states of equilibrium, the trigger 1 comprising for example two vacuum valves 3 and 4 enclosed in a single envelope and having their anodes and control electrodes cross-coupled by resistances 5 to 10 as shown. Resistances 11 and 12 are also connected in the cathode leads of the valves 3 and 4. The trigger 2 is generally the same as the trigger 1 and the corresponding parts are denoted by the same reference numerals but are distinguished by the suffix "*a*." The anode load resistances 5, 5*a*, 8 and 8*a* of the valves are returned to a positive potential source of +300 volts, the control electrodes are returned via resistances 7, 7*a*, 10 and 10*a* to a negative potential source of −300 volts, while the cathode resistances 11, 11*a*, 12 and 12*a* are taken to ground. The only distinction between the successive triggers is that the cathode resistances are progressively varied in value so that the cathode potential of a conducting valve in a given trigger is about 2 volts less than the cathode potential of a conducting valve in the next preceding trigger. The cathode of the valve 3 is coupled to the control electrode of the valve 3*a* via a time constant circuit, consisting of a resistance 13 and condenser 14, and a unilaterally conductive device 15 in the form of a germanium diode. The condenser 14 has one electrode connected as shown to a bus bar 16 by means of which transfer pulses can be applied, one such pulse being indicated by the reference 17. The time constant of 13 and 14 is arranged to be long relative to the duration of the transfer pulses but short relative to the intervals between the transfer pulses, which, as will be understood, is the digit interval of the register. The junction of 13 and 14 is connected by a resistance 18, large compared with resistance 13, to the +300 volt source so that the cathode of the diode 15 is maintained at a potential 10 volts positive with respect to the cathode of the valve 3, irrespective of the state of the valve 3. The cathode of the valve 4 is connected to the control electrode of the valve 4*a* by elements 13*a*, 14*a*, 15*a* and 18*a* similar to 13, 14, 15 and 18.

In describing the operation of the circuit, it will be assumed that in the first instance valve 3 is not conducting and the valve 3*a* is conducting, that is to say the trigger 1 is in the state representing a digit of value 0 and the circuit 2 is in the state representing a digit of value 1. The cathode of the valve 3 is at ground potential and therefore the cathode of the unilaterally conductive device 15 is at +10 volts. The cathode of the valve 3a is at (say) +8 volts and the control electrode of the valve 3a is at slightly higher potential. The device 15 is therefore just not conducting. On the other hand the cathode of the valve 4 is at +10 volts, the cathode of the device 15a is at +20 volts, while the control electrode of the valve 4a is at ground potential. The device 15a is therefore also held-off, about 20 volts being the maximum back-potential applied to the devices 15 and 15a. The transfer pulses 17 are of negative polarity with an amplitude of about 20 volts. On the application of such a pulse, both the devices 15 and 15a conduct and the control electrode of the valve 3a is carried to a potential of −10 volts and the control electrode of the valve 4a is carried to a potential of zero volts irrespective of the previous conditions of the valves 3a and 4a. This situation is maintained until the end of the pulse 17, by virtue of the time constants of 13 and 14 and of 13a and 14a, irrespective of the fact that the trigger 1 may change its state to assume that of the next preceding trigger under the influence of the same pulse. Therefore at the end of the transfer pulse, the trigger 2 is left with valve 3a non-conducting and the valve 4a conduction, the condition of the trigger 1 having thus been transferred to the circuit 2, and similarly with each succeeding trigger. In the interval between successive transfer pulses the condensers 14 and 14a are again charged to the potential of the respective cathodes.

Figure 2:
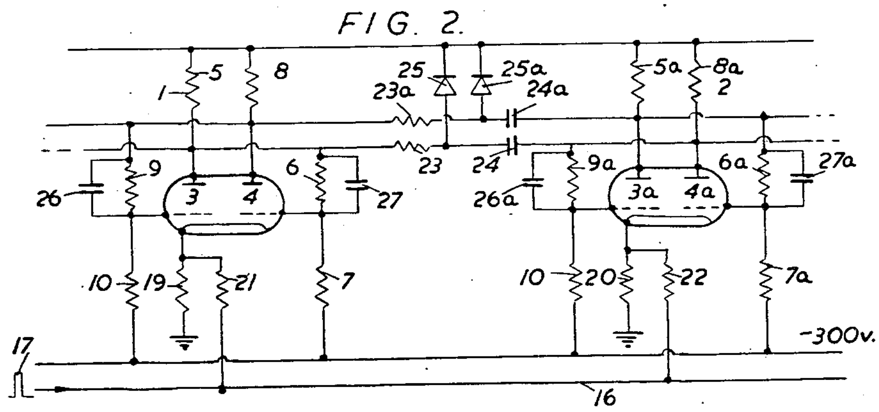
Figure 2 illustrates another form thereof.

The form of the invention illustrated in Figure 2 is generally of the same construction as described with reference to Figure 1 and corresponding parts have been indicated by the same reference numerals. However, in the case of Figure 2, coupling is between the anodes of the valves 3 and 4a, and 4 and 3a respectively. The valves 3 and 4 and similarly the valves 3a and 4a have common cathode resistances 19 and 20, and the transfer pulse bus bar 16 is connected in common to all the cathodes by resistances 21 and 22 as indicated, the transfer pulses 17 being of positive polarity and 30 volts amplitude. The coupling of the anodes of the valves 3 and 4a is effected by the series combination of resistance 23 and condenser 24 and a unilaterally conductive device 25, connected from the junction of 23 and 24 to the +300 volt source. The anodes of the valves 4 and 3a are similarly coupled by resistance 23a, condenser 24a and unilaterally conductive device 25a. Moreover, resistances 6, 9, 6a and 9a are shunted by condensers 26, 27, 26a and 27a respectively, as shown.

To describe the operation of the arrangement, it will be assumed that both the circuits 1 and 2 are in state 0, that is the valves 3 and 3a are non-conducting and the valves 4 and 4a are conducting. Condensers 24 and 24a are charged to the potential difference between the respective anodes, the left-hand electrode of the condenser 24 being more positive than its right-hand electrode, and vice versa in the case of the condenser 24a. If a positive transfer pulse 18 is now applied to the bus bar 16, and thence to the cathodes of valves 3a and 4a (and also to cathodes of all other trigger valves) it tends to reverse the state of the trigger 2, cutting off both valves 3a and 4a for the duration of the pulse, the transfer pulse only requiring an amplitude sufficient to switch off both valves. The anode of the valve 4a therefore tends to rise to +300 volts. This tends to bring the left-hand electrode of the condenser 24 to a potential well above +300 volts but this section is prevented by conduction through the device 25 so that the anode of the valve 4a is prevented from rising and the tendency for a reversal of state of the trigger 2 is resisted, the valve 4a being restored to the conducting condition on the termination of the transfer pulse. If, on the other hand, prior to the occurrence of the pulse, the circuit 1 is in state 0 as described while the circuit 2 is in state 1, that is to say the valve 3a is conducting, neither of the condensers 24 or 24a is charged so that the anode potential of the valve 3a is not prevented from rising when a transfer pulse is applied. Moreover, the time constant of the resistance 9a and the condenser 26a maintains the control electrode of the valve 4a at a sufficient positive potential to render this valve conducting when the transfer pulse ceases so that at the end of the pulse the circuit 2 assumes the alternate state, that is state 0. It may be advantageous to interpose additional smoothing circuits between the valve anodes and the respective resistances 23 and 23a and also to return the cathodes of the devices 25 and 25a to a potential, slightly different from the general positive polarising potential.

The arrangement shown in Figure 2 may be modified by returning the unilaterally conductive devices 25 and 25a to the transfer pulse bus bar and arranging that the normal potential of the latter is at or near the positive polarising potential and that it is fed with negative transfer pulses of about 10 volts. In this case only that device will conduct which is fed from the anode of the valve of the preceding trigger which is non-conducting and the negative transfer pulse will be passed through it to trigger the next stage if the valve concerned is not already conducting.

Figure 3:
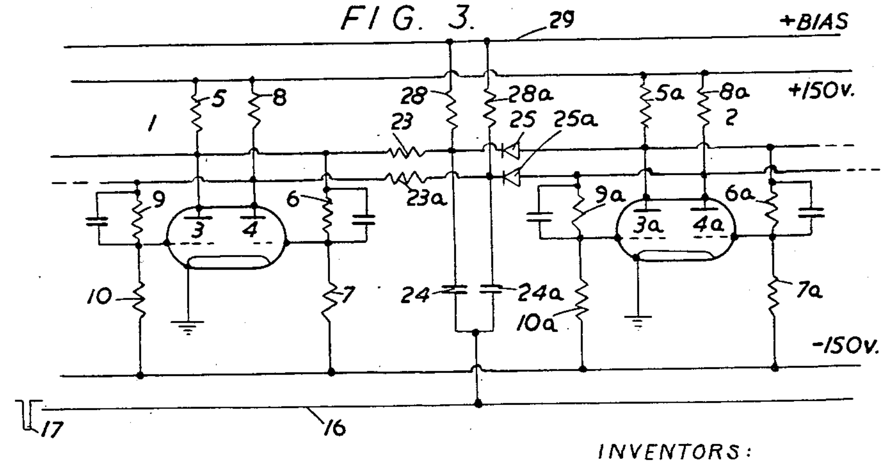
Figure 3 illustrates a modification of Figure 2.

In the modification of Figure 2 illustrated in Figure 3, coupling is between the anodes of like valves in the triggers 1 and 2, i. e. between valves 3 and 3a and between valves 4 and 4a and the positions of the condensers 24 and 24a are interchanged with the devices 25 and 25a, the condensers 24 and 24a being, moreover, connected at one side to the transfer pulse bus bar 16. The junction of the condenser 24 and the unilaterally conductive device 25, and the junction of 24a and 25a, are connected by resistances 28 and 28a to a line 29 which serves to apply a positive bias potential. Transfer pulses 17 are applied to the bus bar 16 with negative polarity.

In this modification the bias potential which is applied by the line 29 is such that if the coupled anodes of the triggers 1 and 2 are at the same potential, a transfer pulse 17 is prevented from affecting the trigger 2, which is what is wanted since no change of state of the trigger 2 is required. On the other hand, if the triggers 1 and 2 are in different states one anode of trigger 1 will be at a lower potential than the corresponding anode in trigger 2. Hence on the application of a transfer pulse, the relevant device conducts and the state of trigger 2 is changed to conform to that of trigger 1 at the time of application of the pulse.

Figure 4:
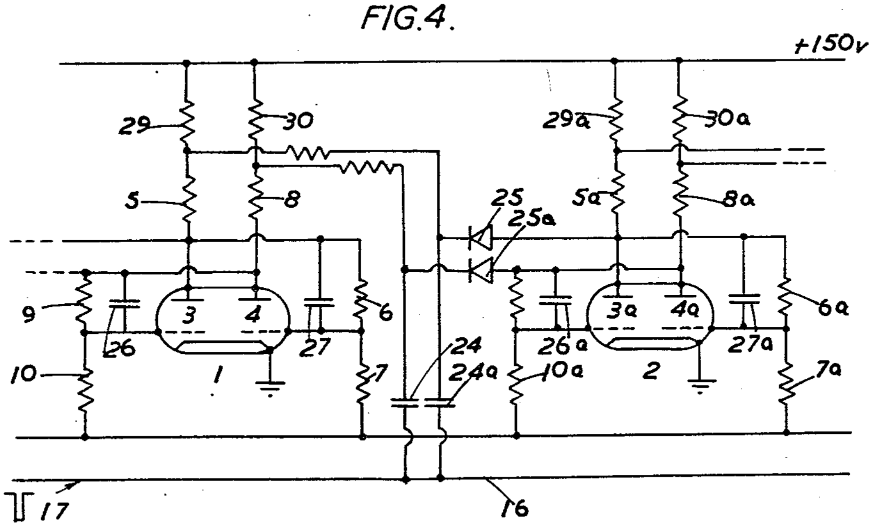
Figure 4 illustrates a modification of Figure 3.

In the modification of Figure 3 which is illustrated in Figure 4, the trigger valves 3, 3a, 4 and 4a have additional resistances 29, 29a, 30 and 30a connected in the anode leads as shown, in series with the anode resistances 5, 5a, 8 and 8a. The positive bias required at the cathodes of the unilaterally conductive devices 25, 25a is provided by connecting the resistance 23 to the junction of resistances 5 and 29 and by connecting the resistance 23a to the junction of resistances 8 and 30 respectively. The bias so applied is sufficient just to maintain the device 25 (say) non-conducting in the event that the valve 3 is conducting and the valve 3a non-conducting, and a similar consideration applies to the device 25a. It will be understood that the couplings from the trigger 2 to the next trigger lead from the junction of the resistances 5a and 29a and the junction of resistances 8a and 30a, respectively.

In a practical form of the arrangement shown in Figure 4, the components have the following values:

| | | |
|---|---|---|
| Resistances 5, 8 | ohms | 7,500 |
| Resistances 9, 6 | do | 39,000 |
| Resistances 10, 7 | do | 68,000 |
| Resistances 23, 23a | do | 33,000 |
| Resistances 29, 30 | do | 8,200 |
| Condensers 24, 24a | micro-microfarads | 470 |
| Condensers 26, 27 | do | 100 |

The valves 3 and 4 are constituted by a double triode of type 12AT7. The corresponding components of each trigger have the same values and the arrangement operates with transfer pulses of an amplitude of about 15 volts.

While the invention has been described as applied to shifting registers for transferring numbers one digit per shift, as in computors operating in the time-serial mode, the invention may also find application to registers operating in the parallel mode, where it is required to transfer the contents of one register bodily to another register in a single "sideways" shift. In this case the couplings would be between corresponding triggers in the different registers.

From the foregoing description, it will be appreciated that in all the registers illustrated, there is a direct coupling from one electrode of one valve of one trigger to a like electrode of one valve of the second trigger, the expression "like" electrode being intended to indicate that the coupled electrodes are either high potential electrodes, such as anodes, or low potential electrodes such as control electrodes or cathodes. Moreover the term "direct" coupling is intended to indicate that the coupling is direct from the first electrode specified to the second electrode specified and is not made by way of an intermediate electrode as for instance if an anode of one valve is coupled to the control electrode of another valve and thence to an anode by virtue of the cross coupling of the valves of the trigger. Such a coupling would not constitute a direct coupling from anode to anode.

What we claim is:

1. An electronic register comprising at least two triggers, each trigger comprising two valves each having an output electrode, a control electrode and a cathode, and a cross-coupling from the output electrode of each valve to the control electrode of the other valve to produce two equilibrium states of the trigger with only one valve conducting in each state, an impedance in the cathode circuit of each trigger valve, a first path including the series combination of a resistance and a unilaterally conductive device connected from the cathode circuit of one valve of one trigger to the control electrode circuit of one valve of the second path including the trigger, a second series combination of a resistance and a unilaterally conductive device connected from the cathode circuit of the other valve of the first trigger to the control electrode circuit of the other valve of the second trigger, and means for biassing said unilaterally conductive devices to maintain the respective devices normally nonconducting in any equilibrium state of said triggers, a source of transfer pulses, and storage means for applying the pulses from said source to said junctions to render said devices conducting in dependence upon the equilibrium states of said triggers to produce a change of state of said second trigger if said triggers are initially in unlike states.

2. An electronic register comprising at least two triggers, each trigger comprising two valves each having an output electrode, a control electrode and a cathode, and a cross-coupling from the output electrode of each valve to the control electrode of the other valve to produce two equilibrium states of the trigger with only one valve conducting in each state, a first path including the series combination of a resistance and a storage device connected from the output electrode circuit of one valve of one trigger to the output electrode circuit of one valve of the second path including the trigger, a second series combination of a resistance and a storage device connected from the output electrode circuit of the other valve of the first trigger to the output electrode circuit of the other valve of the second trigger, a source of bias potential, different unilaterally conductive paths from said bias source to the junctions of the resistances and storage devices in said series combinations, said bias potential being predetermined to maintain said unilaterally conductive paths normally nonconducting in any equilibrium state of said triggers, a source of transfer pulses, and means for applying pulses from said latter source to said triggers to render said unilaterally conductive paths conducting in dependence upon the equilibrium states of said triggers and produce a change of state of said second trigger if said triggers are initially in unlike states.

3. An electronic register according to claim 2 comprising a cathode impedance common to both valves of the second trigger, and the means for applying pulses from said latter source to said triggers comprising a coupling from said latter source to said cathode impedance.

4. An electronic register comprising at least two triggers, each trigger comprising two valves each having an output electrode, a control electrode and a cathode, and a cross-coupling from the output electrode of each valve to the control electrode of the other valve to produce two equilibrium states of the trigger with only one valve conducting in each state, a first path including the series combination of a resistance and a unilaterally conductive device connected from the output electrode circuit of one valve of one trigger to the output electrode circuit of one valve of the second trigger, a second path including the series combination of a resistance and a unilaterally conductive device connected from the output electrode circuit of the other valve of the first trigger to the output electrode circuit of the other valve of the second trigger, means for biassing said unilaterally conductive devices to maintain the respective devices normally nonconducting in any equilibrium state of said triggers, a source of transfer pulses, and storage means for applying pulses from said source to said paths to render said devices conducting in dependence upon the equilibrium states of said triggers and produce a change of state of said second trigger if said triggers are initially in unlike states.

5. An electronic register comprising at least two triggers, each trigger comprising two valves each having an output electrode, a control electrode and a cathode and two potential divider chains connected from a source of relatively high potential to a source of lower potential, the output electrode of one valve and the control electrode of the second valve being connected respectively to higher and lower potential points on one divider chain and the output electrode of the second valve and the control electrode of the first valve being connected respectively to higher and lower potential points on the second divider chain whereby said valves are cross-coupled to produce two equilibrium states of the trigger with only one valve conducting in each state, a first path including the series combination of a resistance and a unilaterally conductive device connected from a point in one divider chain in one trigger to a point in one divider chain in the second trigger, a second path including the series combination of a resistance and a unilaterally conductive device connected from a point in the other divider chain of the first trigger to a point in the other divider chain in the second trigger, the points of connection of said paths to the divider chains being predetermined to bias said unilaterally conductive devices and maintain said devices normally nonconducting in any equilibrium state of said triggers, a source of transfer pulses, and capacitive means for applying pulses from said source to said path to render said devices conducting in dependence upon the equilibrium states of said triggers and produce a change of state of the second trigger if said triggers are initially in unlike states.

6. A register according to claim 5, each of said paths being connected from a point on the divider chain of the first trigger located between the respective output electrode and said potential source to the point of connection of the respective output electrode on the divider chain of the second trigger.

7. An electronic register comprising at least two triggers, each trigger comprising two vacuum valves each having an output electrode, a control electrode and a cathode electrode, and a cross-coupling from the output electrode of each valve to the control electrode of the other valve to produce two equilibrium states of the trigger with only one valve conducting in each state, a first transfer coupling direct from one electrode of one valve of one trigger to a like electrode of one valve of the second trigger, a second transfer coupling direct from one electrode of the other valve of one trigger to a like electrode of the other valve of the second trigger, said transfer couplings each including a unilaterally conductive device and means for biassing said device to maintain said device normally non-conducting in any equilibrium state of said triggers, a source of transfer pulses, and means for applying pulses from said source to said couplings to render said devices selectively conducting and produce a change of state of the second trigger if said triggers are initially in unlike states.

References Cited in the file of this patent

UNITED STATES PATENTS

| | | |
|---|---|---|
| 2,498,908 | Baldinger | Feb. 28, 1950 |
| 2,536,808 | Higinbotham | Jan. 22, 1951 |
| 2,557,186 | Hamacher | June 19, 1951 |
| 2,566,078 | Bliss | Aug. 28, 1951 |
| 2,580,711 | Harper | Jan. 1, 1952 |
| 2,719,227 | Gordon | Sept. 27, 1955 |

OTHER REFERENCES

Electronic Engineering, December 1950, pp. 494, 495; "An Electronic Digital Computor," by Booth.